US008051199B2

(12) United States Patent
Li et al.

(10) Patent No.: US 8,051,199 B2
(45) Date of Patent: Nov. 1, 2011

(54) SELF-ROUTING ADDRESS ASSIGNMENT IN PACKET-SWITCHED NETWORKS

(75) Inventors: Victor On-Kwok Li, Hong Kong (CN); Chun-Yin Li, Hong Kong (CN); Ping-Kong Alex Wai, Hong Kong (CN); Xiaochun Yuan, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 679 days.

(21) Appl. No.: 09/877,744

(22) Filed: Jun. 8, 2001

(65) Prior Publication Data

US 2003/0061376 A1   Mar. 27, 2003

(51) Int. Cl.
*G06F 13/00* (2006.01)
(52) U.S. Cl. ........ 709/238; 709/245; 370/411; 370/389; 370/392
(58) Field of Classification Search .......... 709/238, 709/245; 370/389, 392, 411
See application file for complete search history.

(56) References Cited

U.S. PATENT DOCUMENTS

| 5,060,305 | A |   | 10/1991 | Prucnal et al. ............... 359/140 |
| 5,297,137 | A | * | 3/1994  | Ofek et al. .................... 370/403 |
| 5,418,780 | A | * | 5/1995  | Henrion ........................ 370/397 |
| 5,461,615 | A | * | 10/1995 | Henrion ........................ 370/355 |
| 5,506,840 | A | * | 4/1996  | Pauwels et al. ............... 370/397 |
| 5,537,400 | A | * | 7/1996  | Diaz et al. .................... 370/412 |
| 5,638,377 | A | * | 6/1997  | Quinquis et al. ............. 370/392 |
| 5,708,661 | A | * | 1/1998  | Lee et al. ..................... 370/399 |
| 5,745,489 | A | * | 4/1998  | Diaz et al. .................... 370/395.7 |
| 5,768,258 | A | * | 6/1998  | Van As et al. ................. 370/236 |
| 5,875,190 | A | * | 2/1999  | Law ........................... 370/395.42 |
| 5,925,097 | A | * | 7/1999  | Gopinath et al. ............. 709/200 |
| 6,157,643 | A | * | 12/2000 | Ma ............................ 370/389 |

(Continued)

FOREIGN PATENT DOCUMENTS

EP   446493 A1 *  9/1991

OTHER PUBLICATIONS

V.W.S. Chan, K.L. Hall, E. Modiano, and K.A. Rauschenbach, "Architectures and technologies for high-speed optical data networks," Journal of Lightwave Technology, vol. 16, No. 12, pp. 2 146-2168, Dec. 1998.

(Continued)

*Primary Examiner* — Kenneth R Coulter
(74) *Attorney, Agent, or Firm* — Berkeley Law & Technology Group, LLP

(57) ABSTRACT

A method and system for assigning self-routing addresses to nodes in a network with arbitrary, including irregular, topology is provided. The method and system are useful in packet-switched networks and in particular optical packet-switched networks for reducing processing associated with routing packets. Each self-routing address encodes a set of paths from all nodes in the network to the destination node. In an embodiment of the invention each output port of each node in a network sends a packet in response to the state of a bit in the self-routing address in a packet. Alternatively, each node address in the network is mapped to a bit in a self-routing address. Furthermore, a node can have multiple self-routing addresses encoding different sets of paths from all other nodes in the network to the node. In addition, hierarchical networks are included among the networks suitable for self-routing addresses.

9 Claims, 12 Drawing Sheets

U.S. PATENT DOCUMENTS

| | | | |
|---|---|---|---|
| 6,765,872 B1* | 7/2004 | Tazaki | 370/235 |
| 6,775,706 B1* | 8/2004 | Fukumoto et al. | 709/230 |
| 6,785,758 B1* | 8/2004 | Kotlowski et al. | 710/305 |
| 7,433,597 B2* | 10/2008 | Wai et al. | 398/45 |
| 2001/0053157 A1* | 12/2001 | Li | 370/466 |
| 2002/0078202 A1* | 6/2002 | Ando et al. | 709/225 |
| 2004/0213570 A1* | 10/2004 | Wai et al. | 398/49 |

OTHER PUBLICATIONS

S. Yao, B. Mukherjee, and S. Dixit, "Advances in photonic packet switching: An overview," IEEE Comm. Magazine, vol. 38, No. 2, pp. 84-94, Feb. 2000.

D.K. Hunter, M.C. Chia, and I. Andonovic, "Buffering in optical packet switches," Journal of Lightwave Technology, vol. 16, No. 12, pp. 2081-2094, Dec. 1998.

N.J. Doran and D. Wood, "Nonlinear-optical loop mirror," Optics Letters, vol. 13, pp. 56-58, Jan. 1988.

N.A. Whitaker, Jr., H. Avramopoulos, P.M.W. French, M.G. Gabriel, R.E. LaMarche, D.J. DiGiovanni, and H.M. Presby, "All-optical arbitrary demultiplexing at 2.5Gb/s with tolerance to timing jitter," Optics Letters, vol. 16, pp. 1838-1840, Dec. 1991.

M. Jinno and T. Matsumoto, "Ultrafast all-optical logic operations in a nonlinear Sagnac interferometer with two control beams," Optics Letters, vol. 16, pp. 220-222, Feb. 1991.

K.L. Hall, and K.A. Rauschenbach, "All-optical bit pattern generation and matching." IEE Electronics Letters, vol. 32, pp. 1214-1215, Jun. 1996.

K. Uchiyama, H. Takara, T. Morioka, S. Kawanishi, and M. Saruwatari, "100 Gbit/s multiple-channel output all-optical demultiplexing based on TDM-WDM conversion in a nonlinear optical loop mirror," IEE Electronics Letters, vol. 32, pp. 1989-1991, Oct. 1996.

J.P. Sokoloff, P.R. Pruncal, I. Glesk, and M. Kane, "A Terahertz optical asymmetric demultiplexer," IEEE Photonic Technology Letters, vol. 5, pp. 787-790, Jul. 1993.

M. Eiselt, W. Pieper, and H.G. Weber, "SLALOM: Semiconductor laser amplifier-based processing nodes," Journal of Lightwave Technology, vol. 13, pp. 2099-2112, Oct. 1995.

A.D. Ellis, D.M. Patrick, D. Flannery, R.J. Manning, D.A.O. Davies, and D.M. Spirit, "Ultra-high speed OTDM networks using semiconductor amplifier-based processing nodes," Journal of Lightwave Technology, vol. 13, pp. 761-770, May 1995.

K.L. Hall and K.A. Rauschenbach, "100-Gbit/s bitwise logic," Optics Letters, vol. 23, pp. 1271-1273, Aug. 1998.

C. Bintjas, M. Kalyvas, G. Theophilopoulos, T. Stathopoulos, H. Avramopoulos, L. Occhi, L. Schares, G. Guekos, S. Hansmann, and R. Dall'Ara, "20 Gb/s all-optical XOR with UNI Gate," IEEE Photonic Technology Letters, vol. 12, pp. 834-836, Jul. 2000.

A. Carena, M.D. Vaughn, R. Gaudino, M. Shell, and D.J. Blumenthal, "OPERA: an optical packet experimental routing architecture with label swapping capability," Journal of Lightwave Technology, vol. 16, No. 12, pp. 2135-2145, Dec. 1998.

D.J. Blumenthal, A Carena, L. Rau, V. Curri, and S. Humphries, "WDM optical IP tap switching with packet-rate wavelength conversion and subcarrier multiplexed addressing," OFC'99, pp. 162-164, 1999.

C. Qiao and M. Yoo, "Optical burst switching (OBS)—a new paradigm for an optical Internet," Journal of High Speed Networks, vol. 8, pp. 69-84, 1999.

M. Renaud, C. Janz, P. Gambini, and C. Guillemot, "Transparent optical packet switching: The European ACTS KEOPS project approach," LEOS'99, vol. 2, pp. 401-402, 1999.

S.T. Tan and D.H.C. Du, "Embedded unidirectional incomplete hypercubes for optical networks," IEEE Transactions on Communications, vol. 41, No. 9, pp. 1284-1289, Sep. 1993.

C.K. Ko and S.Y. Kuo, "Multiaccess processor interconnection using subcarrier and wavelength division multiplexing," Journal of Lightwave Technology, vol. 15, No. 2, pp. 228-241, Feb. 1997.

Paul Totiver, Ivan Glesk, Robert J. Runser, Kung-Li Deng, Ben Y. Yu and Paul R. Prucnal, "Routing of 100 Gb/s Words in a Packet-Switched Optical Networking Demonstration (POND) Node," Journal of Lightwave Tecnology, vol. 16, No. 12, pp. 2169-2180, Dec. 1998.

* cited by examiner

SELF-ROUTING ADDRESS ASSIGNMENT IN PACKET-SWITCHED NETWORKS

FIELD OF THE INVENTION

This invention relates to the field of assigning addresses to nodes in a network for efficient utilization of bandwidth, and more particularly assigning self-routing addresses in self-routing packet-switched optical networks with arbitrary topology.

BACKGROUND OF THE INVENTION

The processing overhead associated with routing packets in packet-switched networks is a major hurdle in implementing high-bandwidth networks. High capacity networks capable of efficiently handling voice, video, and data are necessary to satisfy the growing demand of telecommunication and multimedia services. All-optical communication networks are likely to be the networks of the future in view of their relatively large bandwidths. However, presently implementation of such networks is limited by available switching technologies. Current wavelength division multiplexing networks employ circuit-switching technology making them unsuitable for data applications involving bursty traffic requiring large bandwidth. In part, the challenge is due to the lack of practical optical buffers and the relatively limited number of photonic devices available in comparison to electronics present challenges in implementing optical packet switched networks. See, e.g., Chan et al. and Yao, S. et al., "Advances in photonic packet switching: An overview," *IEEE Comm. Magazine*, vol. 38, No. 2, pp. 84-94 (2000).

Faster switching via optics based logic is a future possibility. In optical packet-switched networks, the optical data needs to be processed and switched at the line speed of ten to hundreds of gigabits per second. Recent advances in optical logic device research demonstrate implementations of boolean logic functions such as AND, OR, NOR, INVERT, and XOR based on ultrafast nonlinear interferometers. Some exemplary references are Doran N. J. et al. "Nonlinear-optical loop mirror," *Optics Letters*, vol. 13, pp. 56-58 (1988); and Whitaker, Jr., N. A. et al., "All-optical arbitrary demultiplexing at 2.5 Gb/s with tolerance to timing jitter," *Optics Letters*, vol. 16, pp. 1838-1840 (1991). However, optical logic devices continue to be bulky making integration difficult. Consequently, complex optical logic circuits are still unavailable.

Another solution for implementing optical packet networks for taking advantage of their bandwidth is transmitting the packet header at a lower speed in another channel as in optical sub-carrier multiplexing, see, e.g., Carena, A. et al., "OPERA: an optical packet experimental routing architecture with label swapping capability," *Journal of Light wave Technology*, vol. 16, No. 12, pp. 2135-2145 (1998); and Blumenthal, D. J. et al., "WDM optical IP tap switching with packet-rate wavelength conversion and subcarrier multiplexed addressing," OFC'99, pp. 162-164 (1999) and optical burst switching, see, e.g., Xiao, C. et al., "Optical burst switching (OBS)—a new paradigm for an optical Internet," *Journal of High Speed Networks*, vol. 8, pp. 69-84 (1999). These methods, however, are sensitive to the synchronization between the processing of the packet payload and the packet header. Consequently, being relatively intolerant of errors, they have questionable reliability.

Another approach for effective use of optical networks with current technology is to reduce the processing requirements, such as switching packets at a node. Such processing relies on electronic or optical switches and processors, thus forming a natural bottleneck. A known technique for reducing processing in routing packets in a network is to assign self-routing addresses to nodes in the network. Self-routing addresses simplify routing control since the address of a node contains all the routing information necessary for other nodes to direct packets to the destination without requiring look-up tables and similar customary processing steps. Intermediate nodes forward the incoming packets to the appropriate output ports using bit-by-bit comparison of the packet headers with the address of the local node. The routing decision, implemented with simple logic gates, does not require the typical lookup tables.

However, self-routing addresses are known to be suitable only for networks with regular topology such as hypercube networks and the Shuffle Net with no more than one address for each node. In other words, implementing self-routing addresses in a network requires mapping the physical topology of the network to logical networks with regular topology. See, e.g., Tan, S. T. et al., "Embedded unidirectional incomplete hypercube for optical networks," *IEEE Transactions on Communications*, vol. 41, No. 9, pp. 1284-1289 (1993); and Kop, C. K. et al., "Multi-access processor interconnection using subcarrier and wavelength division multiplexing," *Journal of Lightwave Technology*, vol.15, No.2, pp.228-241 (1997). This is typically not possible in most networks. An additional drawback of self-routing addresses is that all paths between nodes are fixed resulting in difficulties in implementing congestion control and traffic engineering along with rerouting.

SUMMARY OF THE INVENTION

The present invention provides a method and system for providing self-routing addresses to networks having arbitrary topologies. In accordance with an embodiment of the invention, a protocol to route a packet to an output port of a node depends on the results of bit-by-bit processing of the header address. To this end, a bit in the address header is associated with an output port of a particular node in the network. Then the value of that bit determines whether the packet will be routed through the output port identified by that bit. Accordingly, an address of a node is a self-routing address, provided that if two paths having the same destination node meet at an intermediate node, the subsequent links and nodes used by the two paths, in accordance with the destination node's address, are identical. Moreover, a node may have more than one address with each address encompassing a different set of paths to the node.

In an embodiment of the invention, every output port of all the nodes corresponds to a different bit in the address. Thus, the total number of address bits equals the sum of the number of output ports of the nodes in the network. In an address divided into N sub-field, where N is the total number of nodes in the network, each node processes the sub-field corresponding to the node itself.

In an embodiment of the invention, a bit in the address corresponds to an address in the network. The output port of each node corresponds to a bit in the address header. Thus, the total number of bits in the address equals the number of addresses that is equal to or larger than the number of nodes in the network since some nodes may have more than one address.

In another embodiment of the invention, an address header in a packet is divided into a number of different sub-addresses such that each sub-address corresponds to a different level of hierarchy in a hierarchically organized network.

While the aforementioned addressing scheme requires several bits, the invention includes a method and system for shortening the number of bits.

DETAILED DESCRIPTION OF THE INVENTION

Figure 1:
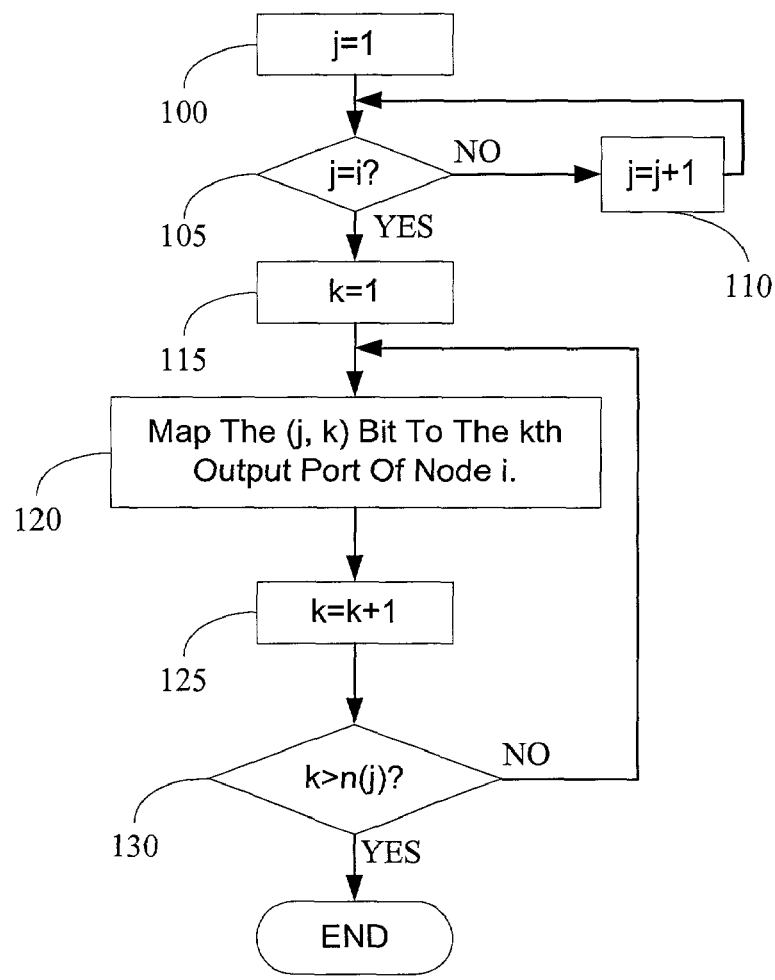
FIG. 1 provides an illustrative flowchart outlining the steps in an exemplary method for associating each output port of a node in the network to a bit position in the self-routing address sub-field corresponding to the node.

Typically, routing a packet in a network requires computing the link over which the packet is transmitted. In view of the large number of packets routed in a typical network, this computation is a significant overhead. One strategy to reduce computations required for routing a packet in a network assigns an address to a node such that in addition to specifying the target node, the address also includes information about the path to the target from any other node in the network. This naturally requires configuring each of the nodes in the network to switch the packet in accordance with the destination address rather than engage in extensive computations to obtain the next link over which the packet should be forwarded to its destination. For instance, a particular bit in a specified destination address results in the packet being switched over a corresponding link. This scheme, naturally, requires careful assignment of addresses to take into account the switches at each node.

Assignment of node addresses that contain the routing information is known for networks having a regular topology, such as hypercubes, Shufflenets, and the like, for optimizing the use of address space. This is not surprising since regular topology enables a uniform distribution of nodes for mapping into the node address space. However, most practical networks exhibit irregular topologies. Moreover, these irregular topologies are dynamic since the network-configuration can change. A method of assigning self-routing addresses to networks having irregular topology, as enabled by the present invention, reduces the processing load at each node, thus resulting in better utilization of the bandwidth.

In the present invention, the address of a node encodes a unique path from any other node in the network to the node itself. This is enabled by the condition that if the paths from two different nodes to the same destination node meet at an intermediate node, the subsequent links and nodes used by the two paths are identical. This property, subsequently referenced as the "Condition," is required by many embodiments in accordance with the invention. However, in a variation, paths in a network can be grouped such that within each group of paths the Condition is satisfied. Then, a node can have multiple addresses, each address corresponding to a particular group of paths that satisfy the Condition. The following discussion and the illustrative figures further illustratively explain the present invention with the aid of several embodiments that are not limiting on the scope of the invention, but merely an aid for providing a description.

In accordance with the Condition, if more than one path from a particular node to a destination node is permitted then the destination node has a more than one address since each address represents a different set of paths to the destination node. Moreover, if a node has multiple addresses, the paths from all other nodes to the destination node encoded in each address satisfy the aforementioned condition separately. However, some of the paths encoded in the different addresses of the same node may be the same. The routing information encoded in each address, for the same node or different nodes, is independent of one another.

In a network having N nodes and L bi-directional links, there are 2L output ports. It should be noted that without any loss of generality the description herein applies to networks described in terms of uni-directional links as well.

In an embodiment of the invention, each bit in the address is used to identify an output port in a node of the network. The nodes are numbered from 1 to N with the output ports of node i numbered from 1 to $n(i)$ where $n(i)$ is the number of output ports of node i.

The address of a node in the network has N sub-fields such that each node in the network corresponds to a particular sub-field in the address. The length of the i-th address sub-field corresponding to node i is at least $n(i)$ bits so that each output port of node i can be mapped to a bit in the address sub-field. Additional bits in an address sub-field are reserved for future use such as in response to the addition of new output ports at node i.

Turning to the figures, FIG. 1 provides an illustrative flowchart of an exemplary method for mapping output ports to bits in an address in accordance with the invention. This method associates each output port of a node with a bit position in the address sub-field corresponding to the node. The notation $b(j, k)$ represents the value of the k-th bit in the j-th address sub-field. Thus, the k-th bit position of the i-th address sub-field in the address identifies the k-th output port one can choose for node i.

During step 100 the variable j is initialized, e.g., to a value of 1. During step 105 the variable j is compared with the specification of a node 'i' to identify the subfield in the destination node corresponding to node i. If variable j is not equal to i, then j is incremented in step 110 with the control returning to step 105. Otherwise, control flows to step 115, during which variable k is initialized. During step 120 the (j, k) bit of the address is mapped to the k-th port of node i. Typically, output nodes are indexed in some order, for instance in accordance with consecutive integers as in FIG. 1, enabling variable k to be indexed in step 125. If variable k is still within sub-field corresponding to node i during step 130, then control returns to step 120 to map another output node of node i. Else, the method terminates.

Figure 2:
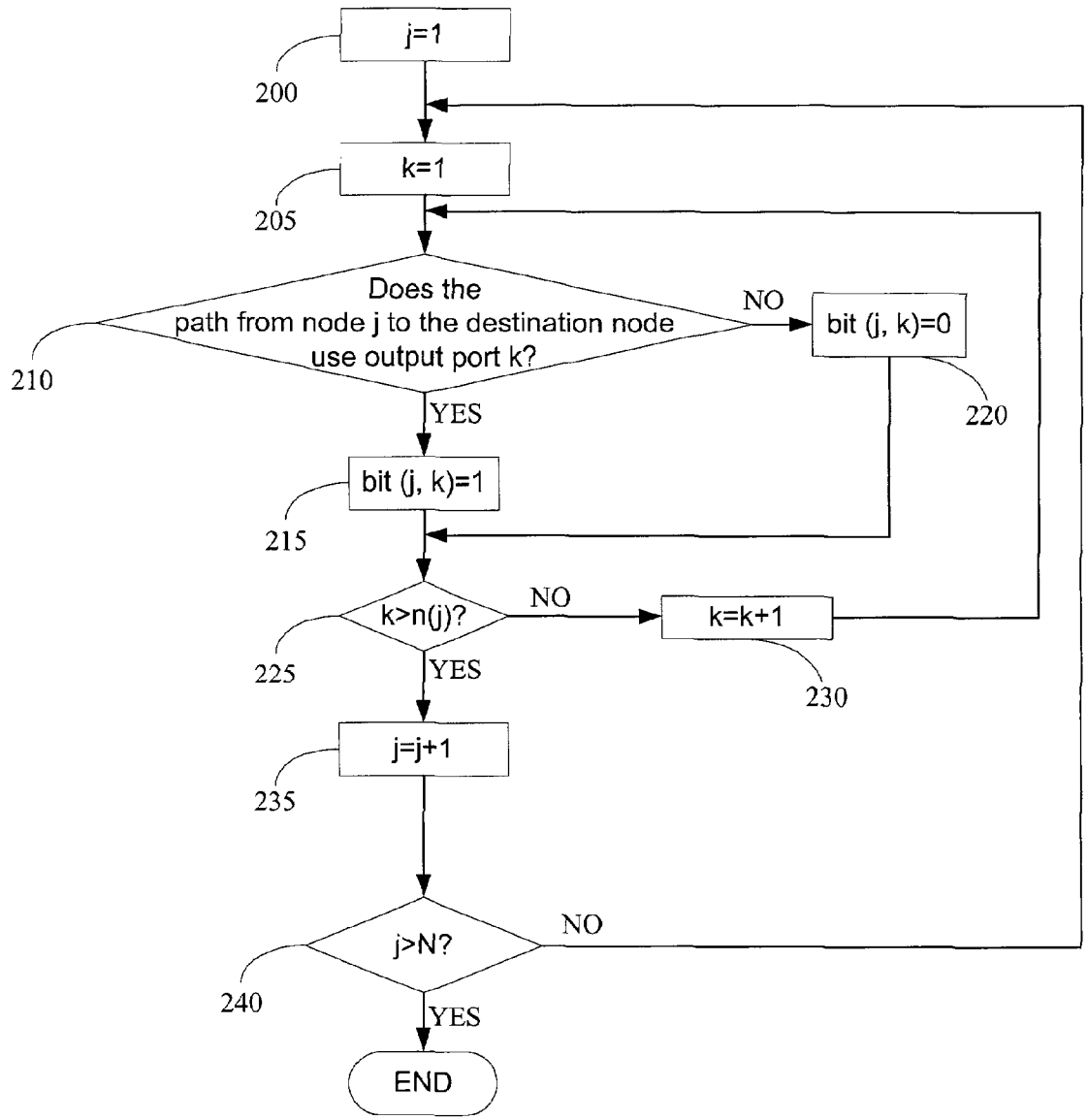
FIG. 2 provides an illustrative flowchart outlining the steps in an exemplary method for generating a self-routing address from a set of paths to a node.

The flowchart in FIG. 2 illustrates exemplary steps in a method in accordance with the invention for generating an address from a set of paths, each path in the set of paths satisfying the Condition, to a destination node of interest, e.g., node i. In each node address, there are at least 2L bits corresponding to L links in the network. For the j-th address field of node i, if j≠i, the k-th bit is set to 1 if the path from node j to node i exits node j through the k-th output port. All other bits in the j-th address sub-field are set to 0. All bits in the i-th address field of node i are set to zero.

During step 200 variable j is initialized and then during step 205 variable k is initialized. During step 210 a determination is made as to whether a path from in the set of paths from node j to the destination node is via output port k. If the determination is affirmative, then the (j, k) bit in the destination node's address is set, during step 215, to enable switching of a suitable packet to the output node k at node j. Otherwise, the (j, k) bit in the address is not set during step 220 resulting in no switching in response to the value of the (j, k) bit in the destination address.

Control from steps 215 and 220 then flows to step 225. During step 225 the value of variable k is examined to determined if all bits in the sub-field in the destination address corresponding to node j have been processed. If the processing is not complete, then processing continues with variable k incremented during step 230 and then the control returning to step 210. Otherwise, control flows to step 235 for incrementing variable j. During step 240 variable j is examined to determine if all of the nodes in the network have been processed. If all nodes are not processed then control returns to step 205 else the method terminates.

Figure 3:
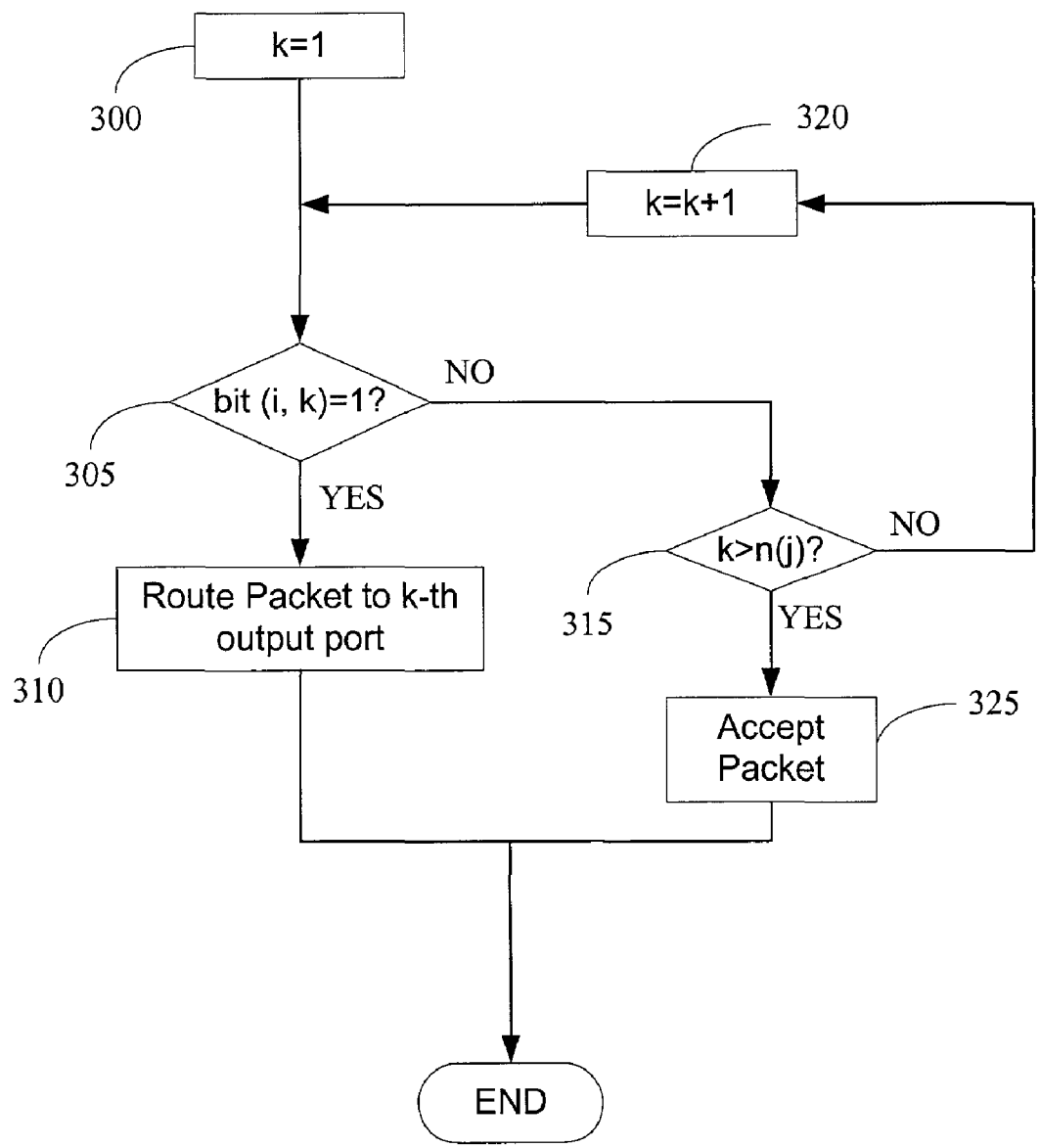
FIG. 3 provides an illustrative flowchart outlining the steps in an exemplary method for routing a packet having a self-routing address in accordance with the invention at a node.

In a network having at least one self-routing address for each node in accordance with the present invention, FIG. 3 illustrates routing of a packet directed to a self-routing address at node i in the network. Packets arriving at node i undergo examination by an address recognition unit that carries out a bit-wise logic operation on the address sub-field corresponding to node i. For instance, if the value of a bit in the address sub-field is set, then address recognition unit causes the packet to be routed to the output port associated with that bit. On the other hand if all of the bits in the address sub-field are not-set, the node accepts the packet as being directed to itself.

During step 300, at node i variable k is initialized followed by examining the bit corresponding to (i, k) in the self-routing address during step 305. If the examined bit is set the packet is routed to the k-th output port of node i during step 310 followed by termination of the method. Otherwise, control flows to step 315 wherein if all bits in the sub-field corresponding to node I have been examined, control is passed to step 320 for accepting the packet followed by termination of the method. Alternatively, if all relevant bits in the address sub-field have not been examined, control flows to step 325 from step 315 for incrementing variable k followed by passing the control to step 305, thus completing a loop for processing bits in a sub-field in the self-routing address.

Figure 4:
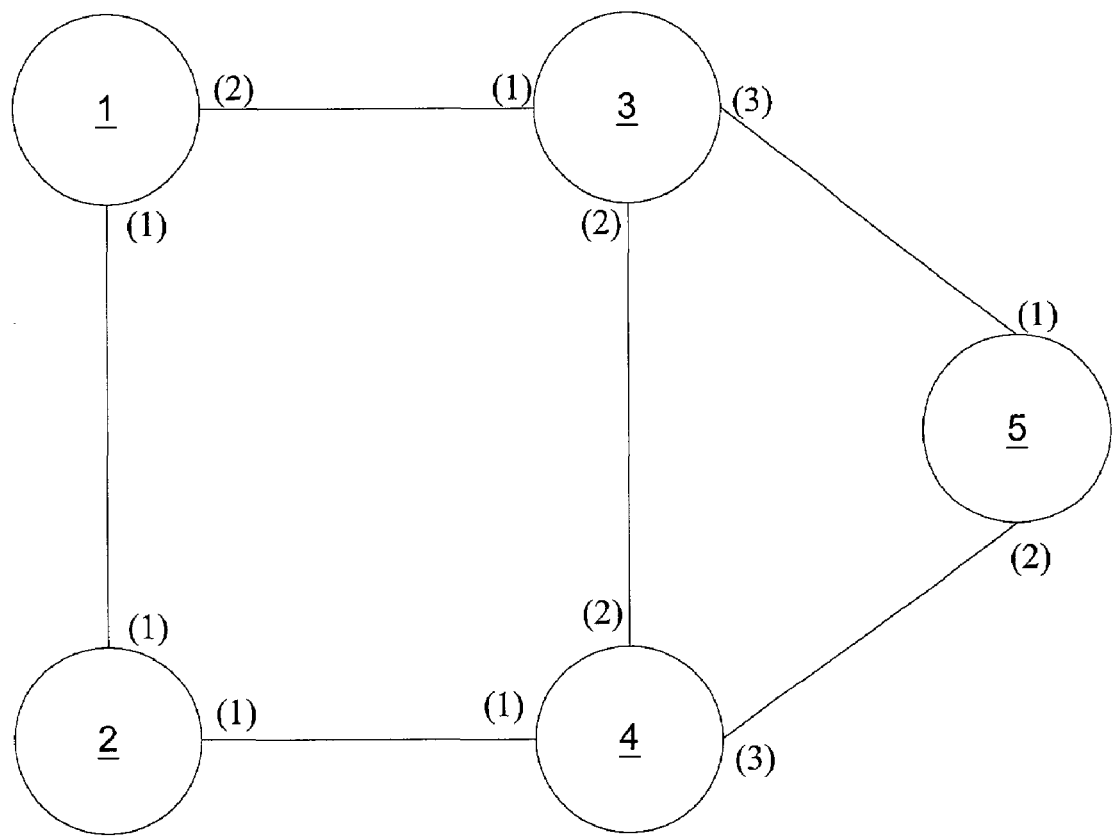
FIG. 4 shows an example network having five nodes and six links.

FIG. 4 illustrates the foregoing description in a network with five nodes, numbered from 1 to 5 with at least one path between each pair of nodes, and six links between adjacent nodes. In this example a path is represented by the sequence of nodes it uses with the path from node i to node j denoted by P(i, j). TABLE 1 lists twenty possible paths in this exemplary network.

TABLE 1

| | | | | |
|---|---|---|---|---|
| Paths to node 1 | P(2, 1) = 21 | P(3, 1) = 31 | P(4, 1) = 421 | P(5, 1) = 5431 |
| Paths to node 2 | P(1, 2) = 12 | P(3, 2) = 312 | P(4, 2) = 42 | P(5, 2) = 542 |
| Paths to node 3 | P(1, 3) = 13 | P(2, 3) = 213 | P(4, 3) = 43 | P(5, 3) = 53 |
| Paths to node 4 | P(1, 4) = 124 | P(2, 4) = 24 | P(3, 4) = 34 | P(5, 4) = 54 |
| Paths to node 5 | P(1, 5) = 135 | P(2, 5) = 2435 | P(3, 5) = 35 | P(4, 5) = 45 |

FIG. 4 depicts the output ports of each node with labels in parentheses. Advantageously, although not as a requirement, the labeling of the output port at each node is local to the node. There are five fields in the address of a node corresponding to the five nodes in the network. The number of bits in each address field, n(i),i=1, . . . , 5, is given by n(1)=2, n(2)=2, n(3)=3, n(4)=3, and n(5)=2. Therefor, the total number of bits in an address for a node in this network, i.e., the sum of n(i) over all of the nodes, is at least 12.

While not intended to be a limitation, for convenience, a bit in the address is set if its value is 1 and not set if its value is 0. As is apparent, the unit for such operations need not be a bit and instead can be a group of bits with no loss of generality, although, for simplicity, the discussion herein uses bits as the significant unit in an address.

An address for node 1 is constructed as follows in accordance with FIGS. 1 to 3. The bits in the first address sub-field are set to zero to ensure that node 1 accepts packets directed to it, for instance, in accordance with the method for handling self-routing addresses illustrated in FIG. 3. For the second address sub-field, the path is P(2,1)=21. Since a packet sent from node 2 to node 1 is transmitted through the output port labeled (1), the first bit of the second address sub-field of node 1 is set to 1 and the second bit of the second address sub-field is set to 0. The second address sub-field of the address of node 1 is therefore 10. Similarly for the third address sub-field, we look at the path from node 3 to node 1. The third address sub-field of the address of node 1 is therefore 100. The address of node 1 so far is 00 10 100 ??? ??.

For the fourth address sub-field, sending a packet from node 4 to node 1 includes routing from node 4 to node 2 through output port (1) of node 4, and then from node 2 to node 1 through output port (1) of node 2. From the first part of the routing instruction, the fourth address sub-field is given by 100. The packet is now at node 2. From the second part of the routing instruction, the second address sub-field in the address of node 1 should be 10 which agrees with what has been put down earlier from the consideration of the path P(2,1). Thus, satisfying the Condition by paths P(2,1), P(3,1) and P(4,1) guarantees consistency.

Similarly, P(5,1) determines the fifth address sub-field. At first sight, the path P(5,1)=5431 is in conflict with the contents of the first 4 address sub-fields because the four paths {P(2,1), P(3,1), P(4,1) P(5,1)} violate the Condition. To accommodate P(5,1), either P(4,1) is changed to 431, or P(5, 1) modified to path 5421. Then, the address of node 1 is 00 10 100 010 01 (1a) for the former case and 00 10 100 100 01 (1b)

for the latter case. If the original paths cannot be modified, the paths P*(4,1)=431 and P*(5,1)=5421 can be added. Node 1 then has two valid addresses, 1*a* and 1*b*. Each of them encodes a different path. In both addresses, the paths from node 2 or node 3 to node 1 are identical. The additional paths, P*(4,1) and P*(5,1) are for address construction purpose only. They are not actually required for packet transmission. For instance, if node 4 only uses address 1*b* and node 5 only uses address 1*a*, then the added paths, P*(4,1) and P*(5,1), are not actually used.

TABLE 2 below lists the self-routing addresses of the five nodes of the network corresponding to the routing paths shown in TABLE 1. The seven addresses listed together encompass all the twenty paths listed in TABLE 1. Notable, besides node 1, node 5 has two addresses because the paths P(1,5), P(2,5), P(3,5), and P(4,5) violate the Condition.

TABLE 2

| Node | Address |
| --- | --- |
| 1a | 00 10 100 010 01 |
| 1b | 00 10 100 100 01 |
| 2 | 10 00 100 100 01 |
| 3 | 01 10 000 010 10 |
| 4 | 10 01 010 000 01 |
| 5a | 01 01 001 010 00 |
| 5b | 01 01 001 001 00 |

Summarizing the above described embodiment of the invention, an address header has N sub-fields corresponding to N nodes in a network with each sub-field associated with one of the nodes. Each sub-field contains n(i) bits where n(i) is greater than or equal to the number of output ports of the node i. Each output port of a node in the network corresponds to one and only one bit position in the sub-field associated with that node. Thus, an address is typically 2L bits long in a bi-directional network where L is the number of links in the network and a link has a port at either end to link two nodes in the network.

In an exemplary embodiment of the invention, an address header contains $N_{add}$ bits where $N_{add}$ is the total number of addresses of nodes in a network having N nodes. Since an address of a node specifies a set of paths from all other nodes to the node, every set of paths to a destination node satisfies the Condition. Note that $N_{add} \leq N$ because a particular node can have more than one address. Each bit position in the address header corresponds to one of the $N_{add}$ addresses. In addressing a packet to a node the bit corresponding to the node address is set, with all other bits not-set. At nodes other than the destination node the address header identifies the output port for routing the packet. Accordingly, switches at the nodes are set to switch the packet. Notable, a node may have multiple addresses and accordingly be associated with multiple bits in the address header.

The $N_{add}$ node addresses are numbered from 1 to $N_{add}$ with no loss of generality. The output ports of each node are also numbered from 1 to n(i) where n(i) is the number of output ports of node i. In this embodiment the bit corresponding to a self-routing address in the set of self-routing addresses in the network is set with all other bits in the address not-set. At each node in the network the set value of this bit results in packet being switched along the path to the destination node. In other words, instead of mapping an output port in a specified node to a particular bit in a self-routing address, it is possible to map an address to a bit in the self-routing address. Then, upon examining the bit each node knows the output port through which the packet needs to be switched in the implementation of the node. However, the output ports on each node in the path may be different in response to the same bit.

Figure 5:
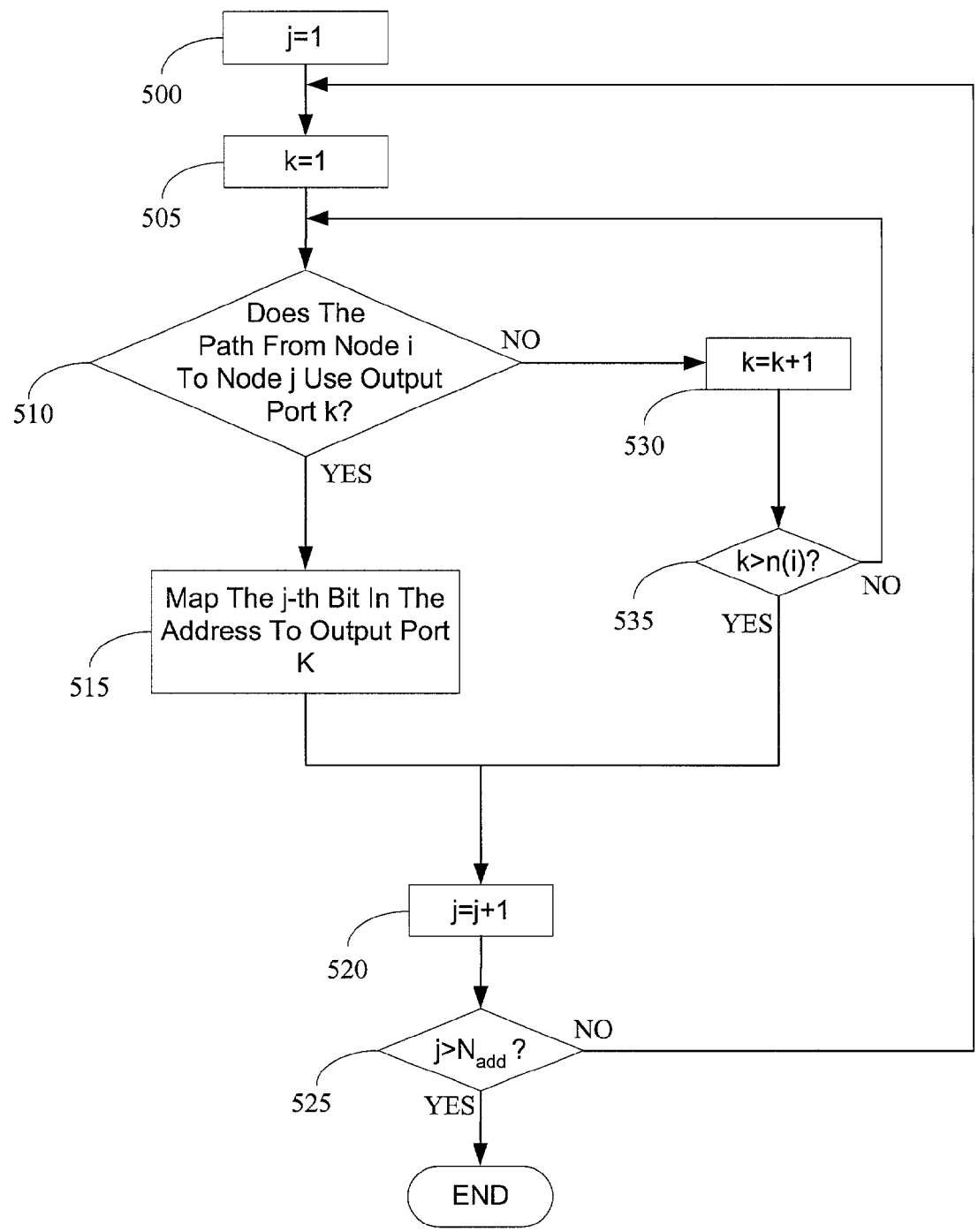
FIG. 5 provides an illustrative flowchart outlining the steps in an exemplary method for associating each output port in a node with a bit position in a self-routing address.

FIG. 5 is a flowchart depicting associating each output port in a node to a bit position in the address header. Since each bit is associated with a set of paths to a destination node, at every node each bit is used to identify the output port through which the path to the destination node identified by the bit exits the node. For example, assume that the j-th bit in the address is associated with a set of paths to node i. Also, if within this set of paths to node i, the path from a node, for example node k, to node i exits node k through the x-th output port of node k. Then, the x-th output port in node k is identified by the j-th bit in the address.

Accordingly, in step 500 in FIG. 5, in the context of the network illustrated in FIG. 4, variable j, representing a node, is initialized followed by initialization of variable k, representing an output port in node i in a self-routing address, during step 505. During step 510 if the path between nodes i and j uses output port k of node i, control flows to step 515, during which the j-th bit in the i-th sub-field is set. Then, control flows to step 520 for incrementing variable j. If all of the nodes in the network have been processed then control flows from the next step 525 to terminate the method. Otherwise control flows from step 525 to step 505 to complete a loop.

If the path from node I to node j does not include output port k of node i, then control flows from step 510 to step 530 for incrementing variable k. If the incremented variable k represents another output port of node I, as determined during step 535, control loops back to step 510. Otherwise, control flows to step 520 for incrementing variable j.

Figure 6:
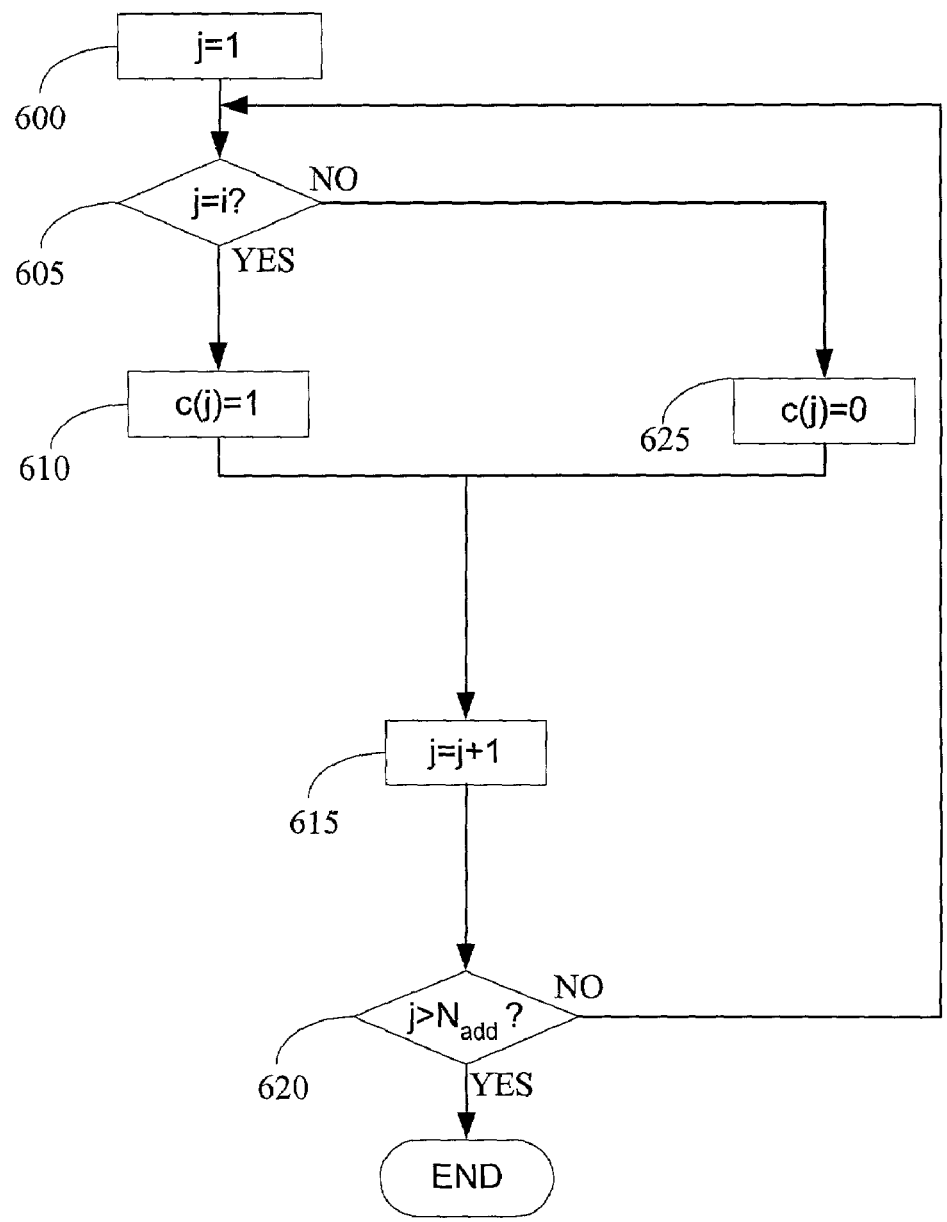
FIG. 6 provides an illustrative flowchart outlining the steps in an exemplary method for generating an address from a set of paths to a node.

FIG. 6 shows a flowchart for generating an address for a node in the alternative embodiment of the invention. The notation in FIG. 6 uses c(j) as the value of the j-th bit in a self-routing address. During step 600 variable j is initialized. Then, during step 605 variable j, representing a self-routing address in the network, is tested to check if it matches variable i, representing a node. In the event, variables i and j match, control shifts to step 610, during which c(j) is set. Following step 610 control passes to step 615 for incrementing variable j. During step 620 if the set of self-routing addresses is not exhausted, control returns to step 605. Otherwise, the method terminates.

Alternatively, control passes from step 605 to step 625 if variable i and j do not match. Then, bit (or set of bits) c(j) are not set during step 625 and control is passed to previously described step 615.

Using the network of FIG. 4 as an example, the first bit in the address represents the set of paths represented by address 1 *a* in TABLE 2. Therefore, the first bit in the address identifies port 1 at node 2, port 1 at node 3, port 2 at node 4, and port 2 at node 5. The length of the self-address is at least $N_{add}$ bits where $N_{add}$ is the number of valid addresses in the network. It should be noted that in some embodiments of the invention extra bits included in the address enable future addition of new addresses or other functions.

TABLE 3 below gives an example of the alternate self-routing addresses for the network shown in FIG. 4 and the set of paths as described in TABLE 2.

TABLE 3

| Node | address |
| --- | --- |
| 1a | 1000000 |
| 1b | 0100000 |
| 2 | 0010000 |

TABLE 3-continued

| Node address | |
|---|---|
| 3 | 0001000 |
| 4 | 0000100 |
| 5a | 0000010 |
| 5b | 0000001 |

TABLE 4 gives the corresponding mapping between the bit position in the address and the output ports at each node in the alternative embodiment of the invention described above.

TABLE 4

| Node | Bit position | | | | | | |
|---|---|---|---|---|---|---|---|
| | 1 | 2 | 3 | 4 | 5 | 6 | 7 |
| 1 | X | x | 1 | 2 | 1 | 2 | 2 |
| 2 | 1 | 1 | x | 1 | 2 | 2 | 2 |
| 3 | 1 | 1 | 1 | x | 2 | 3 | 3 |
| 4 | 2 | 1 | 1 | 2 | x | 2 | 3 |
| 5 | 2 | 2 | 2 | 1 | 2 | x | x |

Figure 7:
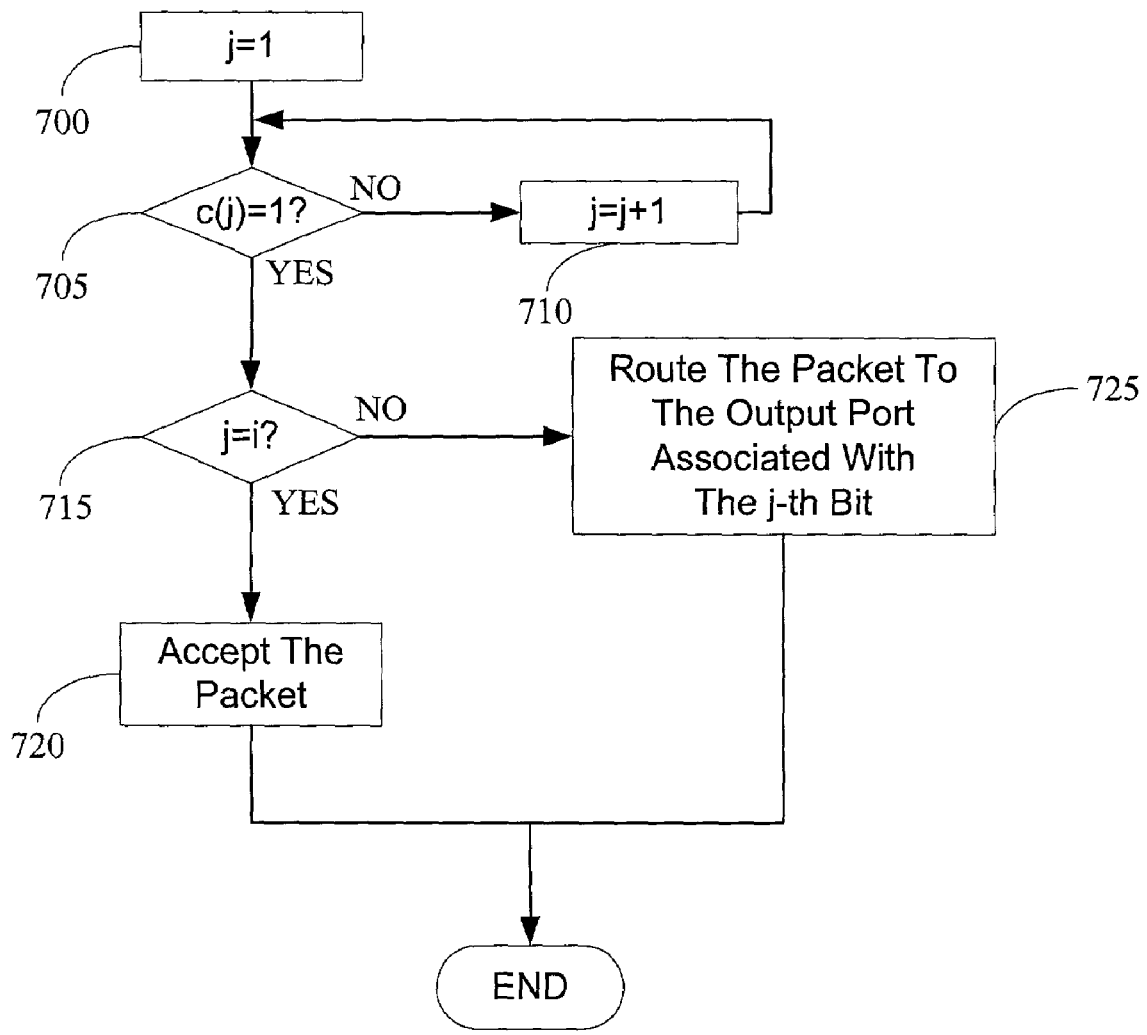
FIG. 7 provides an illustrative flowchart outlining the steps in an exemplary method for routing a packet at a node using the alternate address.

FIG. 7 shows a flowchart for routing a packet at a current node with the self-routing addresses similar to those in TABLE 4. During step 700 variable j, typically corresponding to a bit position in the address in a packet being processed, is initialized. Packets arriving at a node, for example node i, are examined by an address recognition unit of node i. The address recognition unit performs a bit-wise logic operation on the address. For instance, starting at the first bit, if the value of the bit is 0, the address recognition unit processes the next bit in the address. On the other hand, if the value of the bit is 1, and the bit position is not the i-th bit, the address recognition unit instructs an output module to route the packet to the output port associated with that bit. Of course, if the i-th bit is 1, node i accepts the packet.

Thus, during step 705 if bit c(j) is not-set control passes to step 710 for incrementing variable j followed by returning the control to step 705. Otherwise, control passes to step 715. During step 715 if the position of the set bit corresponds to the present node, the present node accepts the packet during step 720. Otherwise, control passes to step 725 from step 715. During step 725, the packet is routed to the output port associated with the j-th bit. The method terminates following either step 720 or step 725.

In another exemplary embodiment of the invention, a network, organized into a hierarchy with M levels having M types of nodes and M types of connections, is provided self-routing addresses. In such a network, level-n nodes ($1 \leq n \leq M$) form level-n sub-networks with level-n links between them. A level-n node, in turn, comprises sub-network of a group of level-(n−1) nodes. The self-routing address of such multi-level network includes, in an embodiment of the invention, a number of sub-addresses. Advantageously, each of these sub-addresses corresponds to one of the levels of a node in the network.

An M level hierarchical network can be constructed, for instance, as described herein from a set of nodes having N nodes. First, all N nodes of the original network are classified as level-1 nodes forming the lowest level in the hierarchy. The N level-1 nodes following division into different groups according to some criterion provide level-2 group of nodes, collectively considered as a level-2 node. The N level-1 nodes following division into different groups according to some criterion provide level-2 group of nodes, collectively considered as a level-2 node. For instance, a possible grouping criterion is the proximity of the nodes from each other. Each group of level-1 nodes forms a sub-network such that each level-1 node can belong to one and only one group of nodes. Connections between the level-1 nodes within the same sub-network are classified as level-1 connections. The level-2 nodes form a network with a different topology than that formed by the level-1 nodes. This process is amenable to iteration with different grouping conditions for each level of organization. Repeating the procedure creates the desired M level hierarchical network.

The multi-level self-routing addresses of the nodes of the network are described next. A self-routing address of a node comprises M sub-addresses. The k-th sub-address of a node corresponds to the address of the node in a level-k sub-network where k=1, . . . , M. The k-th sub-address of a node, for example node i, is constructed by considering the level-k sub-network contained within the level-(k+1) node to which node i belongs. Specifically, the k-th sub-address contains routing information for routing a packet within the aforementioned level-k sub-network to the level-k node to which node i belongs. Note that for address construction purpose, the whole network is considered as a level-(M+1) node.

Figure 8:
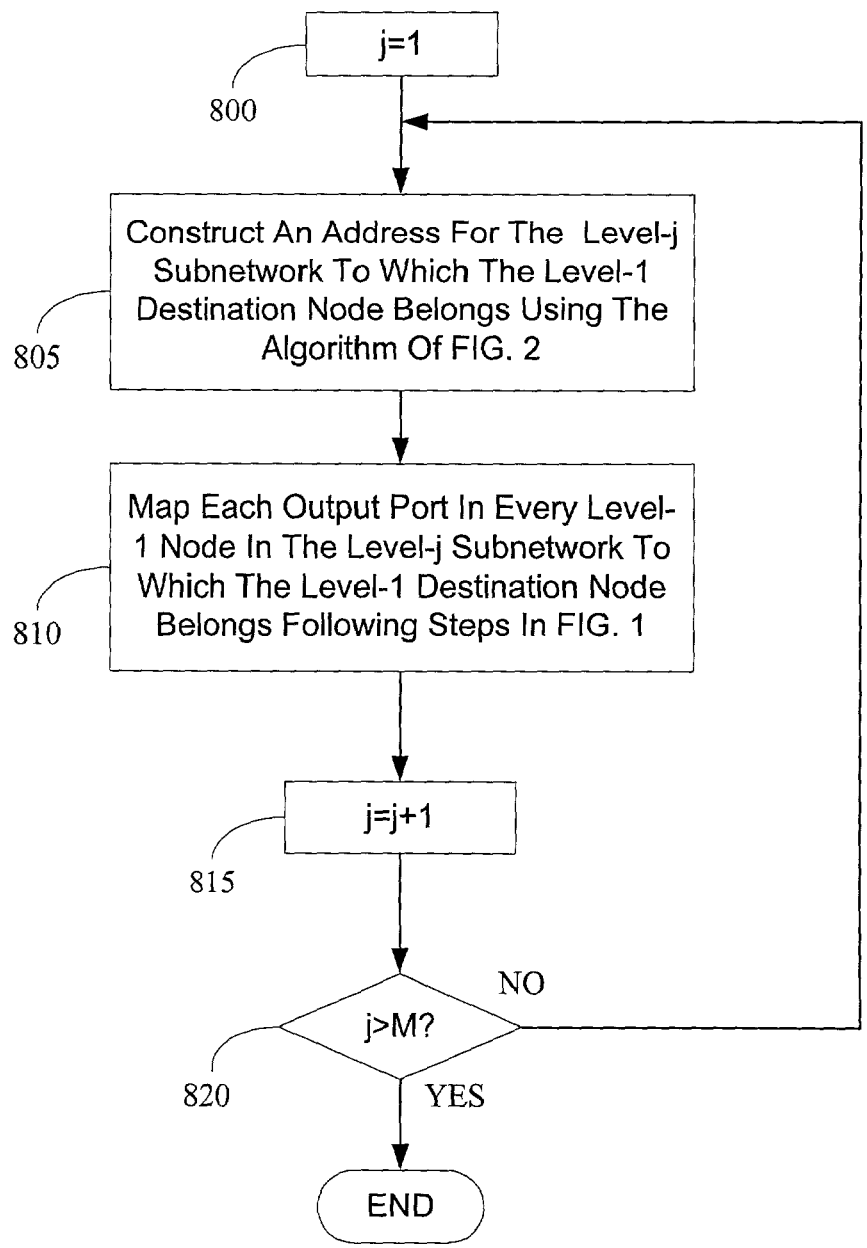
FIG. 8 provides an illustrative flowchart outlining the steps in an exemplary method for generating a multi-level address for a node.

Each of the M sub-addresses can be generated using the algorithms described by the flowcharts shown in FIGS. 1 and 2 or FIGS. 5 and 6. FIG. 8 shows a flowchart for generating a multi-level address for node i. The flowchart illustrates the association between each bit-position in the level-k sub-address to an output port at each of the level-1 node within the level-(k+1) node to which node i belongs.

During step 800 variable j is initialized. Next, during step 805 a level-j address is constructed for the sub-network, for instance in accordance with the steps illustrated in FIG. 2. Each output port in a level 1 node in the level j sub-network is mapped in accordance with the steps listed in FIG. 1 during step 810. Then variable j is incremented during step 815. If all of the levels have been exhausted, as determined during step 820, the method terminates. Otherwise, control returns to step 805. It should be noted that similar processing is employed for algorithms outlined in FIGS. 5 and 6 in alternative embodiments of the invention.

Figure 9:
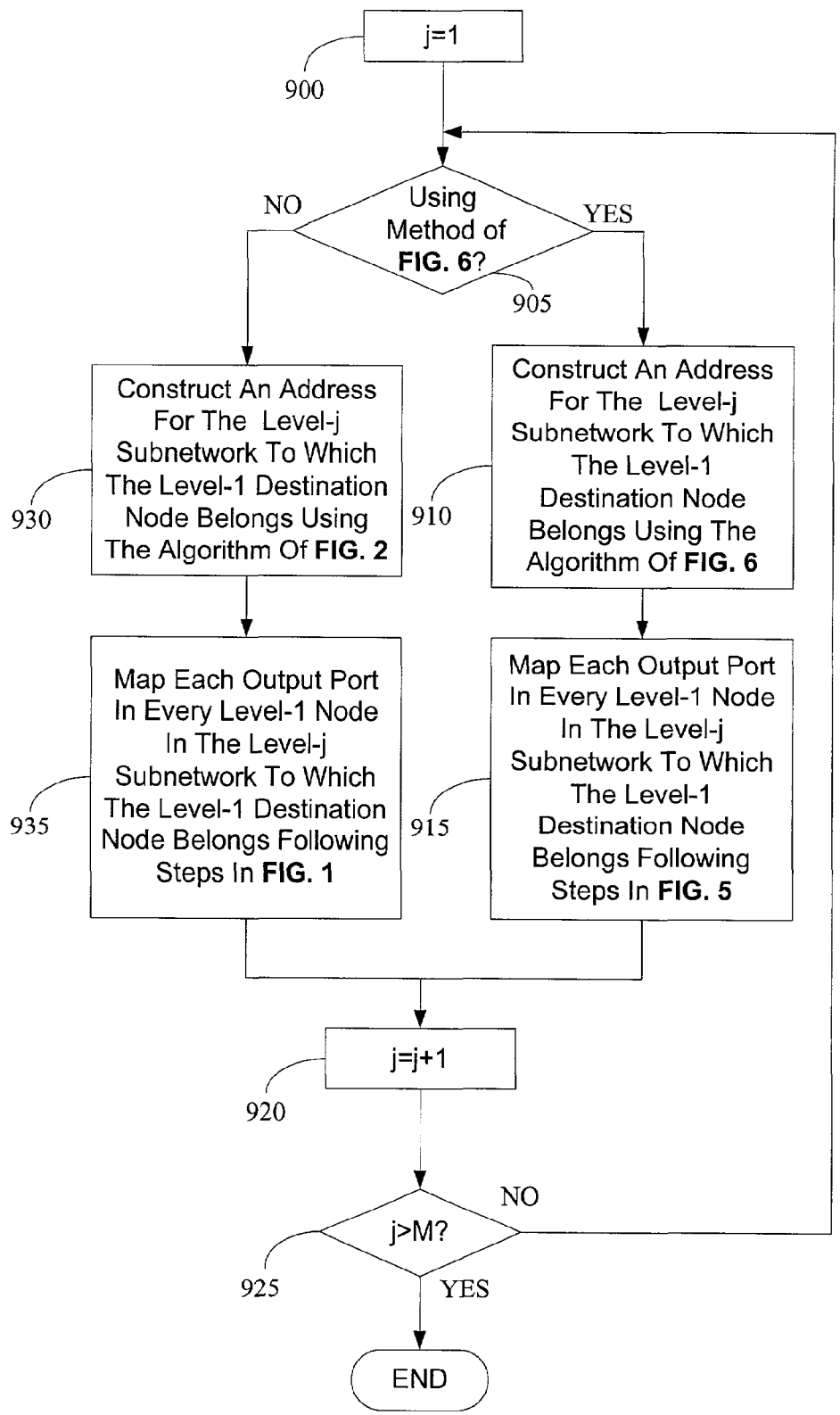
FIG. 9 provides an illustrative flowchart outlining the steps in an exemplary method for generating a multi-level address for a node with the aid of more than one algorithm for different levels.

Moreover, the algorithms from of FIGS. 1 and 2 and FIGS. 5 and 6 can be combined for processing addresses at different levels in a hierarchical addressing scheme. This is illustrated in FIG. 9 next. FIG. 9, similar to FIG. 8, addition of step 905 during which a decision is made to employ a particular algorithm, such as that outlined in FIG. 2 or FIG. 6. However, the algorithms are not restricted to only these two and other algorithms can be employed in alternative embodiments of the invention for providing self-routing addresses in hierarchical networks. Thus, following initialization during step 900, if algorithm of FIG. 6 is employed, control passes to step 910. During step 910 a level-j address is constructed for the sub-network, for instance in accordance with the steps illustrated in FIG. 6. Each output port in a level 1 node in the level j sub-network is mapped in accordance with the steps listed in FIG. 5 during step 915. Then, variable j is incremented during step 920. If all of the levels have been exhausted, as determined during step 925, the method terminates. Otherwise, control returns to step 905.

If the method of FIG. 2 is employed then control passes from step 905 to step 930. During step 930 a level-j address is constructed for the sub-network, for instance in accordance with the steps illustrated in FIG. 2. Each output port in a level 1 node in the level j sub-network is mapped in accordance with the steps listed in FIG. 1 during step 935. Then, variable j is incremented during step 920. If all of the levels have been exhausted, as determined during step 925, the method terminates. Otherwise, control returns to step 905.

Figure 10:
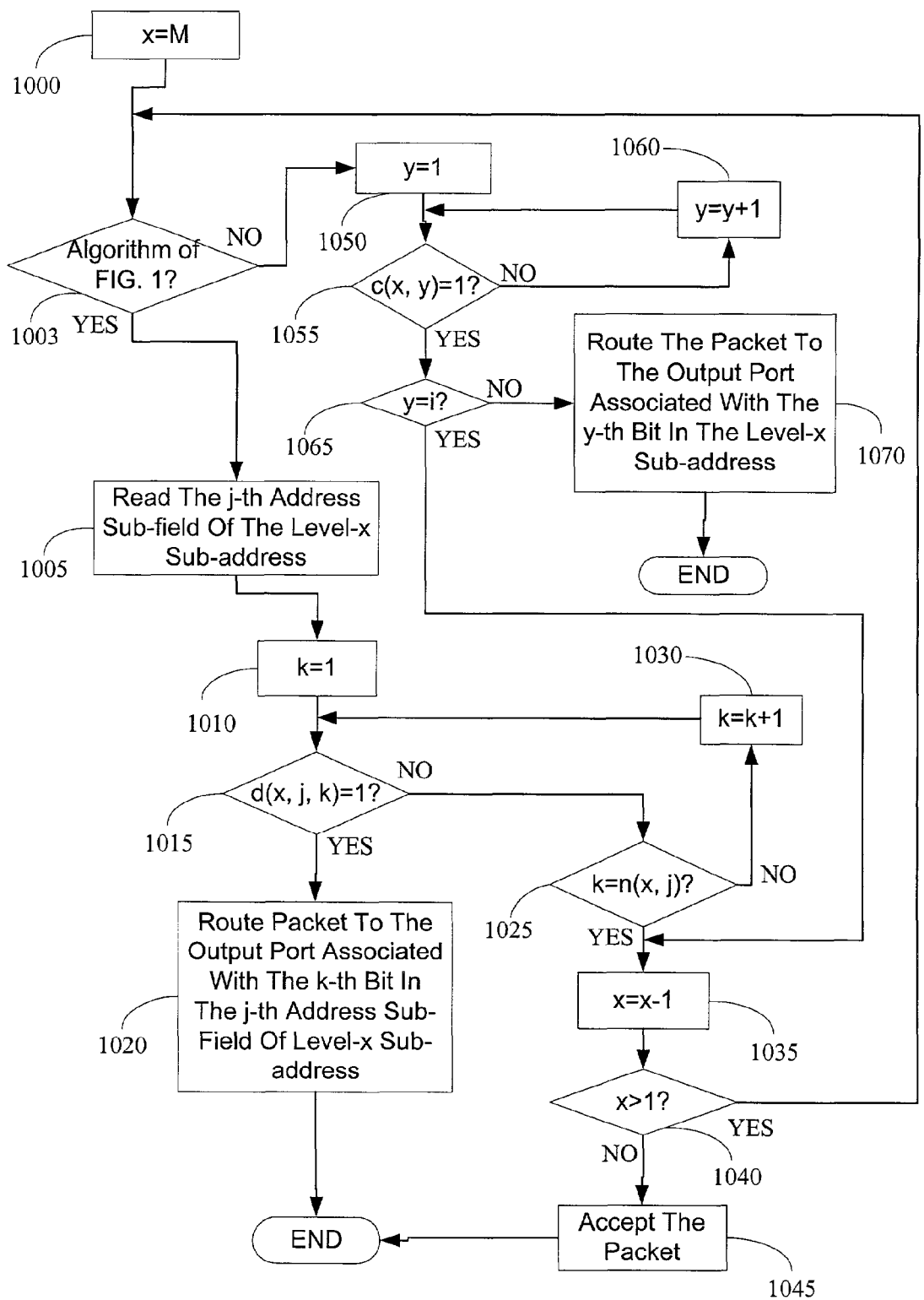
FIG. 10 is a flowchart describing the steps for routing a packet directed to a self-routing address in a hierarchical network having different algorithms for assigning self-routing addresses at different levels in the hierarchical network.

The routing of a packet targeted to such a self-routing address is illustrated in FIGS. 10 for self-routing addresses generated in accordance with FIGS. 1 and 2. In this context, the notation d(x, j, k) represents the value of the k-th bit in the j-th address sub-field in the level-x sub-address. The parameter n(x, j) is the number of bits in the j-th address sub-field of a level-x sub-address. C(x, j) is the value of the j-th bit in a level-x sub-address. The address recognition unit of node j examines packets and performs a bit-wise logic operation starting from level-M sub-address in the packet address header. If the algorithms in FIG. 1 and FIG. 2 are used to generate level-M sub-address, the address recognition unit of node j processes the address sub-field corresponding to the level-M node to which node j belongs.

During step 1000 variable x is initialized to M, the number of levels in the hierarchical network. If the algorithm of FIG. 1 is used to construct the address then control is passed to step 1005 during step 1003. For instance, if the algorithm of FIG. 5 is used then control passes from step 1003 to step 1050. Next, during step 1005, the j-th address sub-field, corresponding to node j, is examined at the x-level. Following initialization of variable k during step 1010, control passes to step 1015. During step 1015 if the bit represented by d(x, j, k) is set then the packet is routed to the output port associated with the k-th bit in the j-th address sub-field of level-x followed by termination of the method.

Alternatively, if the bit represented by d(x, j, k) is not set then variable k is checked against the value for n(x, j) during step 1025. In the event of no match control shifts to step 1030, during which variable k is augmented and control returns to step 1015. However, if a match is determined then the control passes to step 1035. During step 1035 variable x is decremented to a value corresponding to a lower level. In this embodiment the different levels are represented by consecutive integers (not a requirement) so the value of variable k is decremented by 1. If variable x matches a level higher than level 1 during step 1040 then control returns to step 1005. Otherwise, the packet is accepted during step 1045 and the method terminates.

On the other hand if the algorithm of FIG. 5 is employed then control passes from step 1003 to step 1050. If the value of the first bit is 0, the address recognition unit processes the next bit in the sub-address in steps 1050, 1055 and 1060. If the value of the bit is 1, then, during step 1065, if the bit position does not correspond to level-M node to which node j belongs, then control passes to step 1070. During step 1070, the address recognition unit instructs an output module to route the packet to the output port of node j associated with that bit. Then the method terminates. Otherwise control passes to step 1035 during step 1065.

In effect, the steps in FIG. 10 result in the address recognition unit processes the next bit in the address sub-field if it detects the first bit as being not set (the first bit being 0 in this embodiment). On the other hand, if the value of the bit is 1, the address recognition unit instructs the output module to route the packet to the output port of node j associated with that bit. Since at each level only bits in the corresponding sub-field of the address are examined, if all the bits in the address sub-field are 0, the destination level-1 node and node j both belongs to the same level-M node. Furthermore, FIG. 10 illustrates processing of self-routing addresses for hierarchical networks in accordance with more than one algorithm for generating such addresses.

Figure 11:
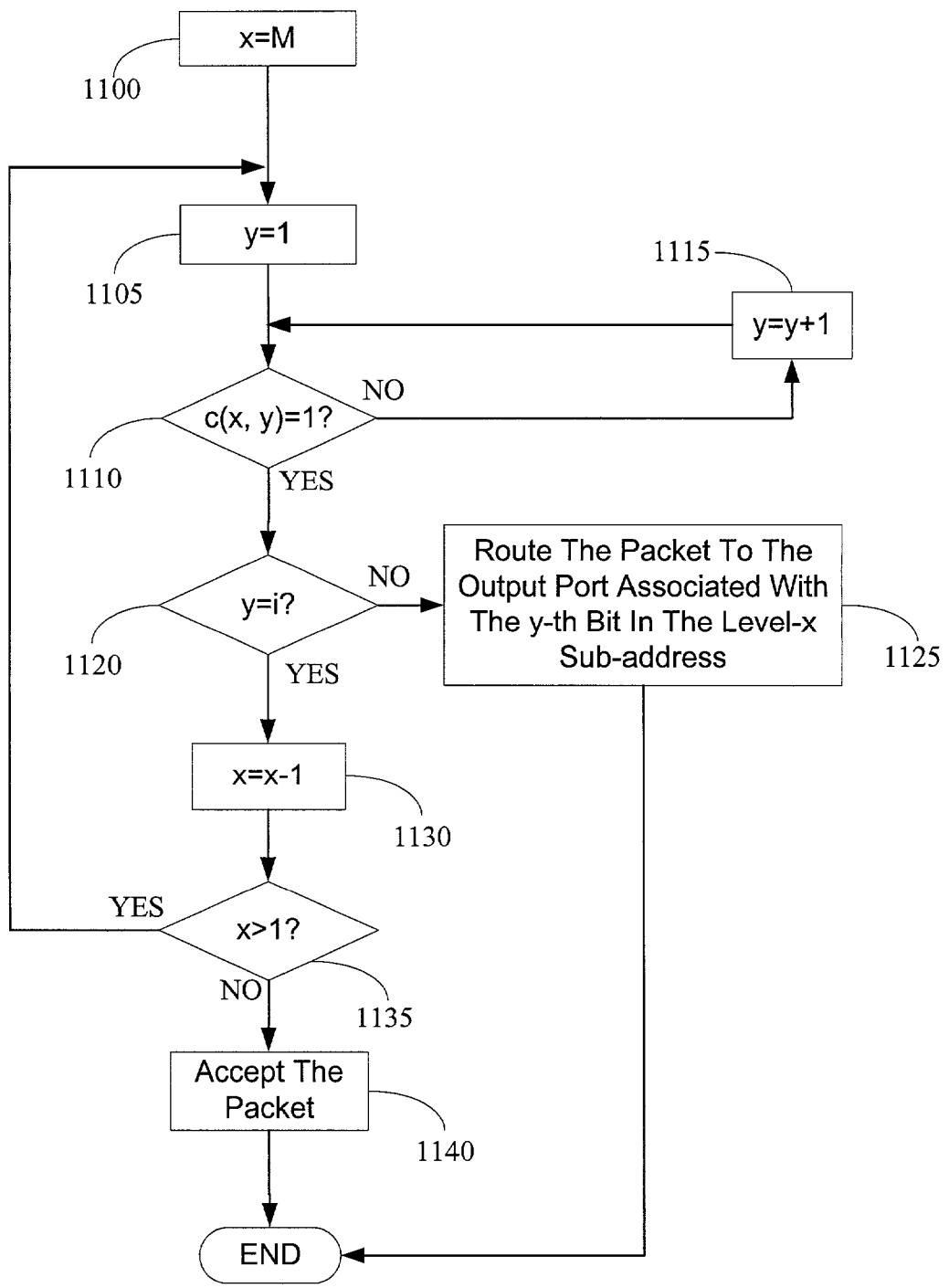
FIG. 11 is a flowchart describing the steps for routing a packet directed to a self-routing address in a hierarchical network having a common scheme for assigning self-routing addresses to nodes at various levels in the hierarchical network.

If only the algorithms in FIGS. 5 and 6 (and similarly for algorithms depicted in FIGS. 1 and 2) are used to generate level-M sub-address, the address recognition unit performs a bit-wise logic operation on the level-M sub-address as shown in FIG. 11. In other words it should be noted that some embodiments of the invention do not need to detect the particular algorithm used to construct the addresses. This is true if only one set of procedures are employed or, alternatively, if the processing is hardwired at each node as expected for self-routing addresses.

Returning to FIG. 11, During step 1100 variable x is initialized to M, the number of levels as in step 1000 of FIG. 10. If the value of the first bit is 0, the address recognition unit processes the next bit in the sub-address in steps 1105, 1110 and 1115. If the value of the bit is 1, then, during step 1120, if the bit position does not correspond to level-M node to which node j belongs. Then the address recognition unit instructs an output module, during step 1125, to route the packet to the output port of node j associated with that bit. Then the method terminates.

Alternatively, if the bit position corresponding to the level-M node to which node j belongs is 1, the destination level-1 node and node j both belongs to the same level-M node. The address recognition unit of node j processes the level-(M−1) sub-address, via step 1130, in the packet address bit by bit. This procedure is iterative, with a node accepting a packet, during step 1140, if the level-1 sub-address, tested during step 1135, indicates that the packet belongs to the node. Otherwise control from step 1135 passes to step 1105.

Figure 12:
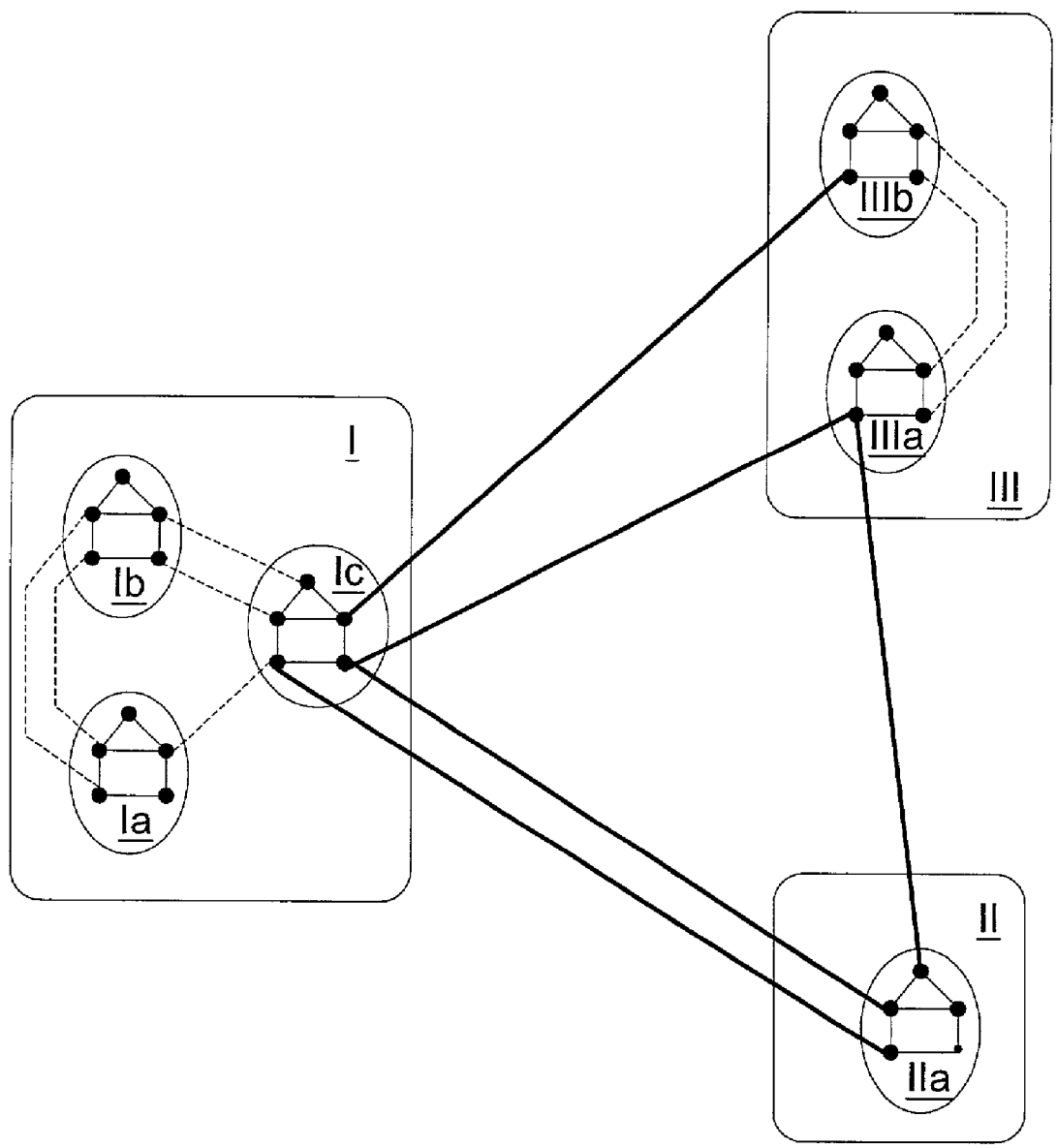
FIG. 12 shows the topologies of an exemplary hierarchical network.

The above description is illustrated by FIGS. 12 in the context of a network organized into three hierarchical levels. In FIG. 12, dots, circles, and rectangles represent nodes at levels 1, 2 and 3 respectively and thin solid lines, dashed lines, and thick solid lines represent connections at levels 1, 2, and 3 respectively. Every level-1 node is part of a level-2 node that, in turn, is part of a level-3 node. From FIG. 12, it si easily seen that the 3 level-1 nodes are organized into 6 level-2 nodes that, in turn, are organized into 3 level-3 nodes.

FIG. 12 shows the six level-1 sub-networks, labeled as Ia, Ib, Ic, Ia, IIIa, IIIb, and IIIc, three level-2 sub-networks, labeled as I, II, and III and one level-3 sub-network that is a combination of the three. For clarity, the topology of the level-2 and level-3 sub-networks is shown with lines of differing thickness and continuity. A sub-network may consist of only one node and there may be multiple connections between two nodes. The numbers in parenthesis are the local labels of the output ports for address construction purpose.

The nodes at levels 2 and 3 are labeled as shown in FIG. 12. The labels used for a level-k node and its content of level-(k−1) sub-network is chosen to be the same for convenience. The hierarchical address of the nodes in the network consists of three parts arranged as [level-3 sub-address][level-2 sub-address][level-1 sub-address]. In the following, we use the algorithms in FIG. 1 and FIG. 2 to construct all three sub-addresses.

In FIG. 12 there is only one set of paths from any level-1 node to each of the level-3 output port. The address sub-fields for level-3 nodes I, II, and III in the level-3 sub-address contain 4, 3, and 3 bits respectively. An example of a level-3 sub-address is [0000 100 010] which indicates that the destination level-1 node belongs to node I. From node III, a packet will be sent to node I through output port (2). From node II, the packet will be sent to node III through output port (1), and then to node I via output port (2) of node III.

The sub-addresses at level-2 and level-1 are constructed similarly. The length of the sub-addresses at the same level varies depending on the number of nodes in that sub-network. From FIG. 12, the level-2 sub-addresses of sub-networks I, II, and III have 10, 0, and 4 bits respectively.

An example of a valid nodal address in the network is [0000 100 010][010 00 010][01 01 001 010 00] which is an address of node 5 at sub-network Ib. Address 5*a* in TABLE 2 is used as the level-1 sub-address. The level-2 sub-address contains the routing instruction at sub-network I because the destination node belongs to node I as indicated in the level-3 sub-address. Another example of a valid address is [1000 000 001][ ][0 10 000 010 10]. It is the address of node 3 at sub-network IIa. The level-2 sub-address is empty because sub-network IIa contains only one node.

According to an aspect of the present invention, a method is provided to shorten the self-routing addresses described in the algorithms in FIGS. 1 and 2. The number of bits is reduced with a slight modification of the self-routing scheme and no increase in hardware complexity. The following is a description of the procedure.

If two bit positions in the address have identical values for all the addresses defined for the nodes of a network, one of the bits can be eliminated. The remaining bit is shared between the two nodes that the two original bits belong. The node with its bit removed will process the remaining bit either first or last in its sub-field depending on whether the other bit is positioned before or after the address sub-field.

If the values of two bits complement each other for all the addresses defined for the network, one of the bits can be eliminated. The remaining bit is shared between the two nodes that the two original bits belong. The node with its bit removed will process the remaining bit either first or last in its sub-field depending on whether the other bit is positioned before or after the address sub-field. The node with its bit removed will use the complement value of the remaining bit.

For instance, if each node in the network shown in FIG. 4 has a unique address as shown in TABLE 5. Columns 5 and 8, columns 7 and 10, and columns 9 and 11 are identical. Columns 2 and 12 are complements of each other. The length of the address is reduced from 12 to 8 bits.

An example of the resulting addresses are given in TABLE 6. In the compressed address format, the bit positions corresponding to the output ports of nodes 1 to 5 in ascending order of the output ports in each node are (1, 2), (3, 4), (5, 6, 7), (5, 8, 7), and (8, 2') respectively, where 2' is the complement of the bit at the 2-nd bit.

TABLE 5

| | Sub-fields | | | | |
|---|---|---|---|---|---|
| Address | 1 | 2 | 3 | 4 | 5 |
| 1b | 00 | 10 | 100 | 100 | 01 |
| 2 | 10 | 00 | 100 | 100 | 01 |
| 3 | 01 | 10 | 000 | 010 | 10 |
| 4 | 10 | 01 | 010 | 000 | 01 |
| 5b | 01 | 01 | 001 | 001 | 00 |

TABLE 6

| | Bit position | | | | | | | |
|---|---|---|---|---|---|---|---|---|
| Address | 1 | 2 | 3 | 4 | 5 | 6 | 7 | 8 |
| 1b | 0 | 0 | 1 | 0 | 1 | 0 | 0 | 0 |
| 2 | 1 | 0 | 0 | 0 | 1 | 0 | 0 | 0 |
| 3 | 0 | 1 | 1 | 0 | 0 | 0 | 0 | 1 |
| 4 | 1 | 0 | 0 | 1 | 0 | 1 | 0 | 0 |
| 5b | 0 | 1 | 0 | 1 | 0 | 0 | 1 | 1 |

In another aspect of the invention, reliability deals with the robustness of the routing scheme in the event of link and/or node failures, while scalability is concerned with the increase in the complexity of the scheme when the network size increases. The present invention uses fixed routing and inherits the disadvantages of fixed routing algorithms. However, unlike traditional self-routing schemes, the address of a node need not be unique. Multiple addresses of a node can be defined to encode multiple paths between nodes. For example, one can define two addresses of a node such that the two paths encoded are disjoint. Then if a path from a source node to the destination node fails, the source node can switch to a different path by using the other address. Address selection can also be based on congestion information, link utilization, and the required quality of service. This simplifies traffic engineering and reduces service interruption.

If multiple nodes and links fail such that none of the paths encoded in all the addresses of a destination node is available to a source node, the addresses of the destination node can be recomputed to contain the new routing information. The new addresses will then be broadcasted to all nodes to update their address tables. We note that only the addresses of the nodes, which use the failed nodes and links, need to be modified because the routing information encoded in each address is independent. The network recovery time depends on the time to compute a new address, the propagation delay for the address broadcast, and the update of the address tables. Since an address of a node can be constructed even if only one path to the node exists, the recovery time depends mainly on the propagation delay.

In an aspect of the present invention, the length of the address equals the sum of the number of output ports in all the nodes of the network. In the second aspect of the invention, the length of the address equals the number of addresses defined for the nodes of the network. Therefore, the length of the address increases linearly with the network size. In general, adding a node or a link will require address update and system reconfiguration which will interrupt services. To minimize the disruptions, additional bits can be reserved in the header for assignment to new nodes or links. The extra unassigned bits will not affect the routing scheme. An advantage of this approach is that the existing addresses are still valid for routing packets between nodes when the new addresses with these extra bits assigned are sent to each node. Hence, there is no disruption in service when nodes or links are added. When nodes or links are removed from the network, new addresses will be sent to all the nodes. After the traffic stops using the nodes and links in question, these nodes and links can be safely taken down without affecting service.

We claim:

1. A method for assigning an address to a node in a network having an arbitrary topology, the method comprising:
   providing a first address to a first node such that the first address includes a description of a path to the first node;
   establishing a mapping between a plurality of output ports in the network and bits in the first address such that a packet, directed to the first node, at a second node in the network is forwarded via an output port on the second node in the network, in response to a specified bit in the first address having a specified value;
   determining whether two bit positions in all the addresses of all nodes in said network are identical; and
   determining whether the values at two bit positions in all the addresses of all nodes in said network are complementary to each other and if so, eliminating one of the bit positions.

2. A method for assigning an address to a node in a network having an arbitrary topology, the method comprising:

assigning a first address to a first node such that the first address includes a description of a path to the first node;

assigning a second address to the first node such that the second address includes a description of another path to the first node;

establishing a mapping between a plurality of output ports in the network and bits in the first or second address such that a packet, directed to the first node, at a second node in the network is forwarded via an output port on the second node in the network, in response to a specified bit in the first or second address having a specified value; and associating an output port in a node to an unused bit in a sub-field corresponding to the node in an address such that in response to a new address for directing a packet to a node in the network, the packet is forwarded via the output port.

3. The method of claim 2, wherein the network comprises an optical network.

4. The method of claim 2, wherein concurrent bits in the first address map to output ports on the second node.

5. The method of claim 4, wherein the map comprises a one-to-one correspondence.

6. The method of claim 4, wherein each of the output ports on the second node maps to a bit in the concurrent bits in the first address.

7. The method of claim 2, wherein the first address includes a description of a path from each node of the network to the first node.

8. A method of addressing a packet in a network having a plurality of nodes, a particular node in the plurality of nodes having at least a first address and a second address, and furthermore, the packet having a plurality of fields including an address header, the method comprising:

mapping each address into a distinct bit in the address header in the packet such that a particular address header corresponds to one and only one address;

configuring, at each node in the network, an output port such that in response to a bit in the address header in the packet having a desired value, the packet is forwarded via the output port;

selecting the desired value for the bit in the address header such that the packet is directed to a node associated with an address corresponding to the packet header, wherein the first address includes a description of a path to the particular node, and wherein the second address includes a description of another path to the particular node;

adding a new address to the network, the new address associated with a second node;

mapping the new address into an unused bit in a new address header in a new packet such that the new address header corresponds to the new address; and configuring, at each node in the network, a second output port such that in response to the unused bit in the address header in the packet having a new desired value, the new packet is forwarded via the second output port whereby the new packet is directed to the second node.

9. A method of establishing a self-routing protocol in an optical packet-switched hierarchical network having an arbitrary topology, a plurality of nodes and organized into at least two levels, each node at a higher level comprising at least one lower-level-node, and each lower-level-node comprising a plurality of output ports, the method comprising:

determining whether a set of paths from all other nodes of said network to a particular node can be stored in an address for the particular node;

identifying, in response to an affirmative determination, each output port at each lower-level-node of said network by a bit position in at least one of the plurality of levels of said addresses;

generating a first multi-level address and a second multi-level address for at least one node of said network, wherein said first multi-level address includes a description of a path to said at least one node, wherein said second multi-level address includes a description of another path to said at least one node, wherein each address comprises a plurality of sub-addresses, wherein each of said sub-addresses is associated with one of the levels of said multi-level network, wherein a sub-address at each level specifies the routing information among a subset of nodes at the level; and shortening a self-routing address of a node in response to determining that more than two or more bits in a plurality of self-routing addresses are identical.

* * * * *